(12) United States Patent
Mohammadi et al.

(10) Patent No.: US 11,098,451 B2
(45) Date of Patent: Aug. 24, 2021

(54) METHODS FOR LIBERATING TRICHOME FIBERS FROM PORTIONS OF A HOST PLANT

(71) Applicant: The Procter & Gamble Company, Cincinnati, OH (US)

(72) Inventors: Khosrow Parviz Mohammadi, Liberty Township, OH (US); Scott Christopher Kreider, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/388,986

(22) Filed: Apr. 19, 2019

(65) Prior Publication Data

US 2020/0359852 A1  Nov. 19, 2020

Related U.S. Application Data

(63) Continuation of application No. 15/378,430, filed on Dec. 14, 2016, now Pat. No. 10,309,057.

(60) Provisional application No. 62/269,430, filed on Dec. 18, 2015.

(51) Int. Cl.
| | |
|---|---|
| *D21H 11/12* | (2006.01) |
| *D21H 27/30* | (2006.01) |
| *D21B 1/06* | (2006.01) |
| *D21B 1/34* | (2006.01) |
| *B32B 29/00* | (2006.01) |
| *D21H 27/00* | (2006.01) |
| *A47K 10/16* | (2006.01) |

(Continued)

(52) U.S. Cl.
CPC ............ *D21H 11/12* (2013.01); *A47K 10/16* (2013.01); *B32B 29/005* (2013.01); *D21B 1/06* (2013.01); *D21B 1/063* (2013.01); *D21B 1/34* (2013.01); *D21H 11/08* (2013.01); *D21H 11/20* (2013.01); *D21H 27/002* (2013.01); *D21H 27/30* (2013.01)

(58) Field of Classification Search
CPC ....................................................... D21H 11/12
USPC ......................................................... 162/99
See application file for complete search history.

(56) References Cited

U.S. PATENT DOCUMENTS

| | | |
|---|---|---|
| 3,863,428 A | 2/1975 | Baxter |
| 3,994,771 A | 11/1976 | Morgan, Jr. et al. |
| 5,772,847 A | 6/1998 | Simpson et al. |

(Continued)

FOREIGN PATENT DOCUMENTS

| | | |
|---|---|---|
| WO | WO-2004044320 | 5/2004 |
| WO | WO-2006137041 | 12/2006 |

(Continued)

OTHER PUBLICATIONS

James Mauseth, Botany, Oct. 25, 2019, Jones and Bartlett Learning, p. 76 (Year: 2019).*

(Continued)

*Primary Examiner* — Anthony Calandra
(74) *Attorney, Agent, or Firm* — Richard L. Alexander; Andrew J. Mueller; Andrew J. Hagerty

(57) ABSTRACT

Improved processes for liberating trichome fibers from non-seed portions of a trichome-bearing host plant are provided. The processes include one or more steps for disassociating trichome fibers that are already separated from leaves, stems, and still-attached fibers so that the separated trichome fibers can be collected and not lost through a waste stream.

20 Claims, 9 Drawing Sheets

(51) Int. Cl.
*D21H 11/08* (2006.01)
*D21H 11/20* (2006.01)

(56) References Cited

U.S. PATENT DOCUMENTS

| | | | |
|---|---|---|---|
| 7,691,472 | B2 | 4/2010 | Vinson et al. |
| 7,811,613 | B2 | 10/2010 | Vinson et al. |
| 8,029,645 | B2 | 10/2011 | Mohammadi |
| 8,056,841 | B2 | 11/2011 | Vinson et al. |
| 8,297,543 | B2 | 10/2012 | Vinson et al. |
| 8,425,722 | B2 | 4/2013 | Mohammadi |
| 8,623,176 | B2 | 1/2014 | Vinson et al. |
| 8,808,501 | B2 | 8/2014 | Vinson et al. |
| 9,011,641 | B2 | 4/2015 | Mohammadi et al. |
| 9,718,065 | B1 | 8/2017 | Cilia |
| 10,227,729 | B2 | 3/2019 | Mohammadi et al. |
| 10,309,057 | B2 | 6/2019 | Mohammadi |
| 10,344,428 | B2 | 7/2019 | Mohammadi et al. |
| 2003/0208859 | A1* | 11/2003 | Neogi ............... A61L 15/28  8/919 |
| 2004/0221975 | A1 | 11/2004 | Kainth et al. |
| 2004/0250969 | A1 | 12/2004 | Luu et al. |
| 2005/0274470 | A1 | 12/2005 | Shannon et al. |
| 2006/0154832 | A1 | 7/2006 | Peltier |
| 2006/0260002 | A1 | 11/2006 | Ronen |
| 2006/0288639 | A1 | 12/2006 | Vinson et al. |
| 2007/0011762 | A1 | 1/2007 | Vinson et al. |
| 2009/0054858 | A1 | 2/2009 | Cheng et al. |
| 2009/0084513 | A1 | 4/2009 | Barnholtz et al. |
| 2010/0239843 | A1 | 9/2010 | Luu et al. |
| 2011/0104419 | A1 | 5/2011 | Barnholtz et al. |
| 2011/0168342 | A1 | 7/2011 | Mohammadi |
| 2011/0226430 | A1 | 9/2011 | Mohammadi |
| 2013/0215995 | A1 | 8/2013 | Mohammadi |
| 2013/0220563 | A1 | 8/2013 | Mohammadi |
| 2014/0083637 | A1 | 3/2014 | Vinson et al. |
| 2014/0138040 | A1 | 5/2014 | Sartini et al. |
| 2014/0141203 | A1 | 5/2014 | Sartini et al. |
| 2015/0176216 | A1 | 6/2015 | Ostendorf et al. |
| 2015/0211186 | A1 | 7/2015 | McNeil et al. |
| 2015/0337496 | A1 | 11/2015 | Lee |
| 2017/0175338 | A1 | 6/2017 | Mohammadi |

FOREIGN PATENT DOCUMENTS

| | | |
|---|---|---|
| WO | WO-2009024897 | 2/2009 |
| WO | WO-2011053956 | 5/2011 |

OTHER PUBLICATIONS

PCT International Search Report dated Feb. 10, 2017—4 pages.
PCT International Search Report dated Jul. 20, 2017—6 pages.
PCT International Search Report dated Jul. 20, 2017—5 pages.
All Office Actions U.S. Appl. No. 14/963,278.
All Office Actions U.S. Appl. No. 15,378,430.
All Office Actions U.S. Appl. No. 16/388,986.
All Office Actions U.S. Appl. No. 15/378,627.
All Office Actions U.S. Appl. No. 15/602,187.
Documentation for ImageJ software, National Institute of Health, 3 pages, 2007, online], retrieved from the Internet, [retrieved Jan. 8, 2017], <URL:https://imagej.nih.gov/ij/index.html>.
Written Opinion.
U.S. Appl. No. 15/378,627, filed Apr. 12, 2016, Khosrow Parviz Mohammadi, et al.
U.S. Appl. No. 15/602,187, filed May 23, 2017, Khosrow Parviz Mohammadi, et al.

* cited by examiner

METHODS FOR LIBERATING TRICHOME FIBERS FROM PORTIONS OF A HOST PLANT

FIELD OF THE INVENTION

The present invention relates to methods for liberating trichome fibers and to fibrous structures comprising individualized trichome fibers.

BACKGROUND OF THE INVENTION

Historically, fibrous structures including those that are used to make sanitary tissue products have been made with softwood fibers and hardwood fibers. For example, softwood fibers have typically made up greater than 20% by weight on a dry fiber basis of through-air-dried fibrous structures. The softwood fibers are longer fibers than the hardwood fibers and they provide greater strength properties to the fibrous structures than do the hardwood fibers. However, softwood fibers typically do not provide the level of softness benefit provided by hardwood fibers.

Trichome fibers have been identified as a good substitute for softwood fibers to provide softness while contributing sufficient strength to a fibrous structure in which they are incorporated. Trichomes are epidermal attachments of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristlelike outgrowth from the epidermis of a plant. Trichomes may protect the plant tissues present on a plant. Trichomes may for example protect leaves and stems from attack by other organisms, particularly insects or other foraging animals and/or they may regulate light and/or temperature and/or moisture. They may also produce glands in the forms of scales, different papills and, in roots, often they may function to absorb water and/or moisture.

Individualized trichome fibers can be artificially separated from portions of their host plant. U.S. Pat. No. 7,811,613 describes a process for liberating trichome fibers that includes a milling operation of non-seed portions of a trichome-bearing plant followed by a screening or air classifying step to separate the trichome fibers from other portions (such as the leaves and stems) of the host plant. FIGS. 1 and 2 illustrate such a process. A feedstock of material that includes leaves, stems, and attached trichome fibers is fed into a vacuum system 10 that has two outlets, an upper outlet 12 to collect dust, and a lower outlet 14 to collect further processable material 16. The main purpose of vacuum system 10 is to transport the feedstock and to begin cleaning the feedstock of dirt, dust, and other waste material. Material 16 continues on to a cyclone 18 that also contains an upper outlet 20 for collecting dust, and a lower outlet 22 that feeds a hammermill 24. Magnets 26 and 28 are included to remove any metal that has been introduced into the feedstock via harvesting, transportation, or handling equipment. Hammermill 24 breaks the leaves and stems up into smaller pieces and separates at least some of the trichome fibers from leaves and stems. Material 30 coming out of hammermill 24 is then directly or indirectly routed into a series of air classifiers 32 and 34, as can be seen in FIG. 2. Air Classifier 32 has a waste outlet 33 for collecting the small leaf and stem pieces. Separated trichome fibers are routed to air classifier 34 and then collected for making fibrous structures.

Unfortunately, systems such as those described above produce low yields (mass of feedstock divided by the mass of trichome fibers collected from air classifier 34); for example, up to around 15%. Low yields discourage commercial leveraging of alternative, sustainable resources for fibers that can be used in paper products. One of the reasons for the low yield is that while trichome fibers can be separated from leaves and stems via the hammermill, many of the separated fibers are still tangled with or otherwise associated with the small leaf and stem pieces. These associated trichome fibers then flow out of the waste outlet 33 and never make their way into the fiber collection used for making fibrous structures. The inventors of the present invention have discovered that one or more additional steps of disassociating separated fibers from other plant portions significantly increases trichome fiber yield. The one or more disassociation steps have also been found to remove dirt and other foreign materials to a greater level so that the collected trichome fiber masses are lighter in color and comprise fewer dark specks, making fibrous structures comprising the processed trichome fibers more consumer acceptable.

SUMMARY OF THE INVENTION

In accordance with one aspect of the present invention, there has now been provided a method for liberating individualized trichome fibers from a non-seed portion of a host plant. The method comprising the steps of providing an initial mass of material comprising a plurality of leaves and stems of a host plant, at least some of which comprising attached trichome fibers; milling the leaves and stems to separate trichome fibers from the same, wherein the milled leaves and stems, and separated trichome fibers define a feed stock; entraining a pressurized fluid stream with the feed stock; thereafter directing the pressurized fluid stream against a fluid flow resistor to disassociate at least some of the separated trichome fibers from the milled leaves and stems to create a refined feed stock; thereafter subjecting the refined feed stock to one or more air classifiers; and collecting material from the one or more air classifiers to define an end mass of material. This method can produce a yield of trichome fibers, as defined by the end mass of material divided by the initial mass of material, is greater than 15%.

In accordance with another aspect of the present invention, there has now been provided a method for liberating individualized trichome fibers from a non-seed portion of a host plant, the method comprising the steps of providing an initial mass of material comprising a feedstock comprising leaves, stems, attached trichome fibers, and separated trichome fibers; disassociating at least some of the separated trichome fibers from the leaves, stems, and still attached trichome fibers to create a refined feedstock; thereafter subjecting the refined feed stock to one or more air classifiers; and collecting material from the one or more air classifiers to define an end mass of material. This method can produce a yield of trichome fibers, as defined by the end mass of material divided by the initial mass of material, is greater than 15%.

In accordance with yet another aspect of the present invention, there has now been provided a fibrous structure comprising a fiber blend comprising wood fibers and trichome fibers, wherein at least some of the trichome fibers have a length that is less than 100 microns.

BRIEF DESCRIPTION OF THE DRAWINGS

The following detailed description of specific embodiments of the present invention can be best understood when read in conjunction with the drawings enclosed herewith.

Figure 1:
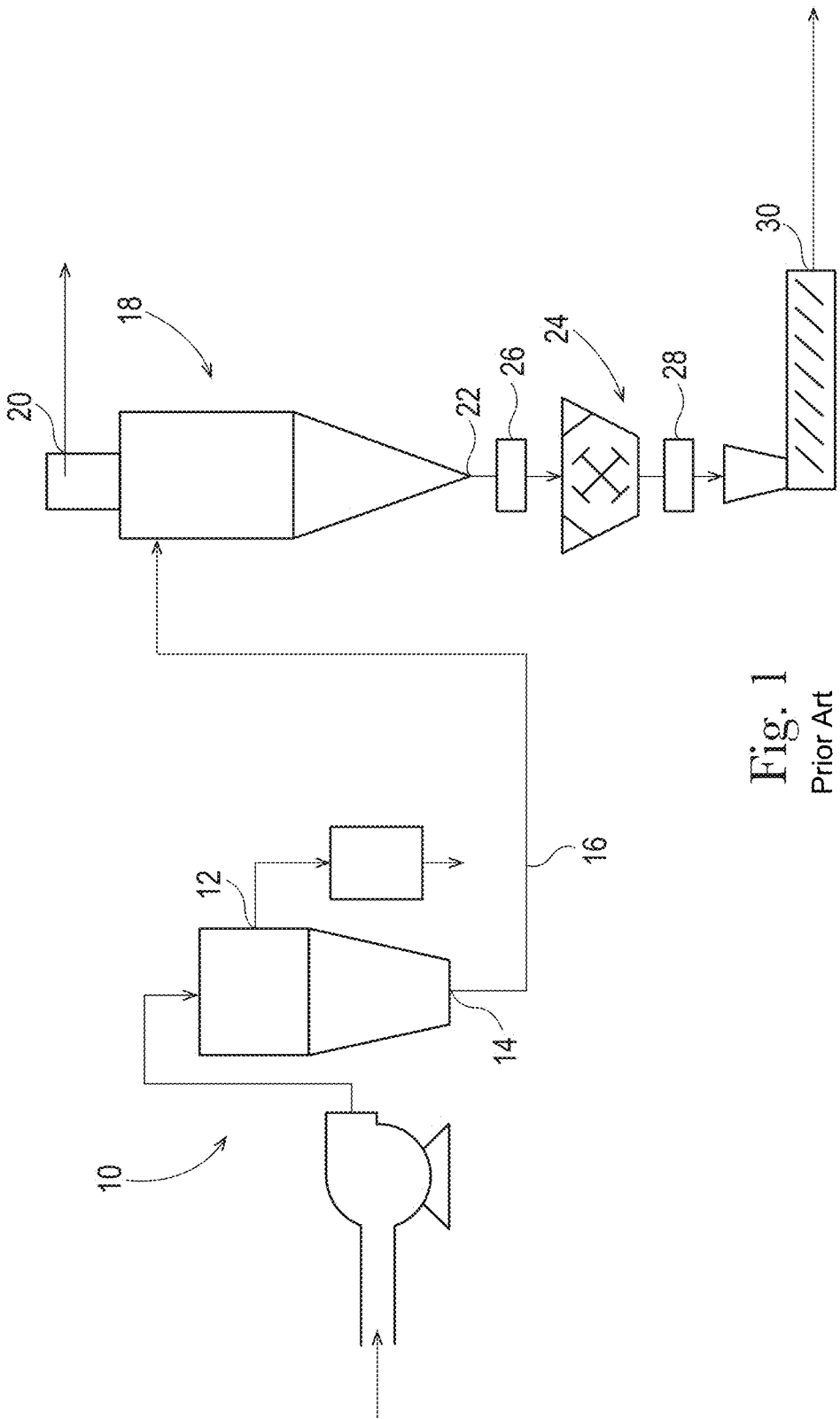
FIG. 1 is a schematic of an exemplary prior art milling process.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION OF THE INVENTION

The following text sets forth a broad description of numerous different embodiments of the present invention. The description is to be construed as exemplary only and does not describe every possible embodiment since describing every possible embodiment would be impractical, if not impossible. And it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

It should also be understood that, unless a term is expressly defined in this specification using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The term "individualized trichome fibers" as used herein means trichome fibers which have been artificially separated by a suitable method for individualizing trichome fibers from their host plant. In other words, individualized trichome fibers as used herein means that the trichome fibers become separated from a non-seed portion of a host plant by some non-naturally occurring action. In one example, individualized trichome fibers are artificially separated in a location that is sheltered from nature. Primarily, individualized trichome fibers will be fragments or entire trichome fibers with essentially no remnant of the host plant attached. However, individualized trichome fibers can also comprise a minor fraction of trichome fibers retaining a portion of the host plant still attached, as well as a minor fraction of trichome fibers in the form of a plurality of trichome fibers bound by their individual attachment to a common remnant of the host plant. Individualized trichome fibers may comprise a portion of a pulp or mass further comprising other materials, including non-trichome-bearing fragments of the host plant.

Individualized trichomes may be converted into chemical derivatives including but not limited to cellulose derivatives, for example, regenerated cellulose such as rayon; cellulose ethers such as methyl cellulose, carboxymethyl cellulose, and hydroxyethyl cellulose; cellulose esters such as cellulose acetate and cellulose butyrate; and nitrocellulose. Individualized trichomes may also be used in their physical form, usually fibrous, and herein referred to "trichome fibers", as a component of fibrous structures.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp.

Further trichome fibers are different from monocotyledonous plant derived fibers such as those derived from cereal straws (wheat, rye, barley, oat, etc.), stalks (corn, cotton, sorghum, *Hesperaloe funifera*, etc.), canes (bamboo, bagasse, etc.), grasses (esparto, lemon, sabai, switchgrass, etc.), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Fiber" as used herein means an elongate physical structure having an apparent length greatly exceeding its apparent diameter, i.e. a length to diameter ratio of at least about 10. Fibers having a non-circular cross-section and/or tubular shape are common; the "diameter" in this case may be considered to be the diameter of a circle having cross-sectional area equal to the cross-sectional area of the fiber. More specifically, as used herein, "fiber" refers to fibrous structure-making fibers. The present invention contemplates the use of a variety of fibrous structure-making fibers, such as, for example, natural fibers, such as trichome fibers and/or wood pulp fibers, or synthetic fibers, or any other suitable fibers, and any combination thereof.

Figure 3:
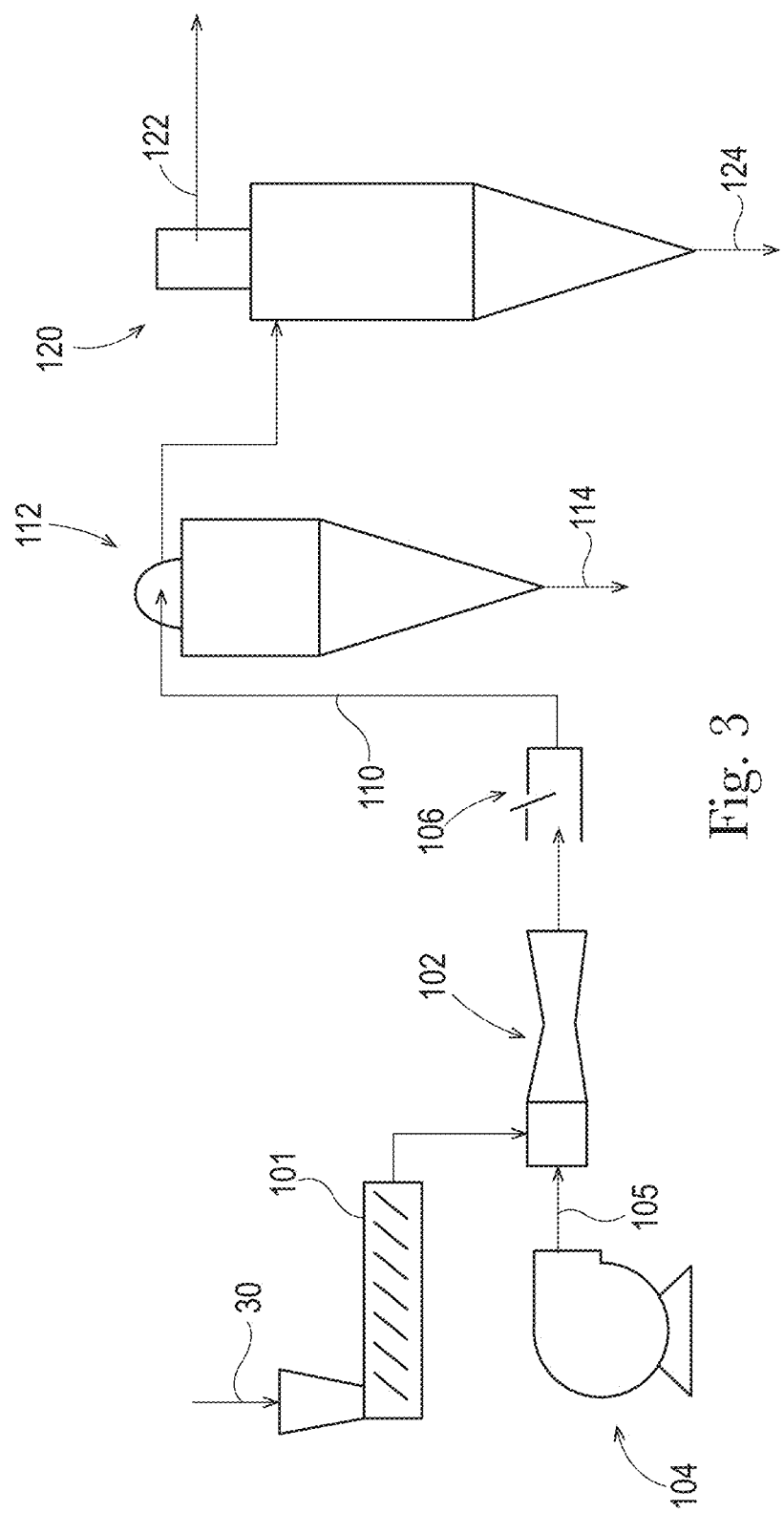
FIG. 3 is a schematic of illustrative process steps according to the present invention.

The present invention is directed to improved processes for liberating trichome fibers from non-seed portions of a trichome-bearing host plant. Exemplary process steps are shown in FIG. 3. A feedstock 100 comprising milled leaves, stems, still attached trichome fibers, and separated trichome fibers is provided; e.g., via a process such as shown in FIG. 1 and described above. Various milling apparatuses can be used to break the leaves and stems into small pieces and to separate at least some of the trichome fibers. Nonlimiting examples of such devices include a ball mill, a pin mill, a hammermill, a rotary knife cutter such as a "Wiley Mill" and/or a "CoMil" sold by Quadro Engineering of Waterloo, Ontario, Canada.

Feedstock 100 is fed into a screw conveyor 101 to feed a venturi mechanism 102. A blower 104 communicates pressurized fluid 105 to venturi mechanism 102. Pressurized fluid 105 becomes entrained with the milled feedstock 100 and is directed to a fluid flow resistor in the form of a breaker plate 106. In one example, the entrained pressurized fluid with the feedstock 100 is directed against the breaker plate 106. Forces encountered because of the venturi mechanism 102 and impacting the breaker plate 106 disassociate at least some of the separated trichome fibers from the leaf and stem pieces to create a refined feedstock 110. Other approaches beyond a breaker plate can be employed to help disassociate separated trichome fibers from remaining plant portions. The fluid flow of the pressurized fluid entrained with the milled feedstock can be impeded, interrupted, or altered by various mechanisms, including, for example, in-line mixers, bends and other directional changes in the fluid flow conduits to introduce increased frictional losses in the fluid flow, impellers, in-line screens, and the like. Different types of forces can also be employed, including impact forces and shear forces, for example.

Milled feedstock 100 can alternatively be processed through other apparatuses prior to being communicated to air classifiers. Such apparatuses include, but are not limited to, refiners, beaters, additional millers (dry and wet), homogenizers, pulpers, cotton millers (also called "pickers" and "openers"), separators, carders, and deflakers.

Trichome fibers can be sorted and collected through various techniques of processing refined feedstock 110. As exemplified in FIG. 3, refined feedstock 110 is communicated to a first air classifier 112. Screening equipment and air classifying equipment are well known in the art. A suitable air classifier is the Hosokawa Alpine 50ATP, sold by Hosokawa Micron Powder Systems of Summit, N.J. Other suitable classifiers are available from the Minox Siebtechnik.

A portion of refined feedstock 110 exits air classifier 112 as a waste stream 114. While a target of waste stream 114 are the milled stems, milled leaves, and dirt, inevitably some of the separated trichome fibers and still attached trichome fibers will be lost through the waste stream 114. The remaining portion of refined feedstock 110 is routed to a second air classifier 120 wherein outlet 122 primarily communicates trichome fiber fines to a first collection device and outlet 124 primarily communicates trichome fibers that are larger than the fines to a second collection device.

Figure 2:
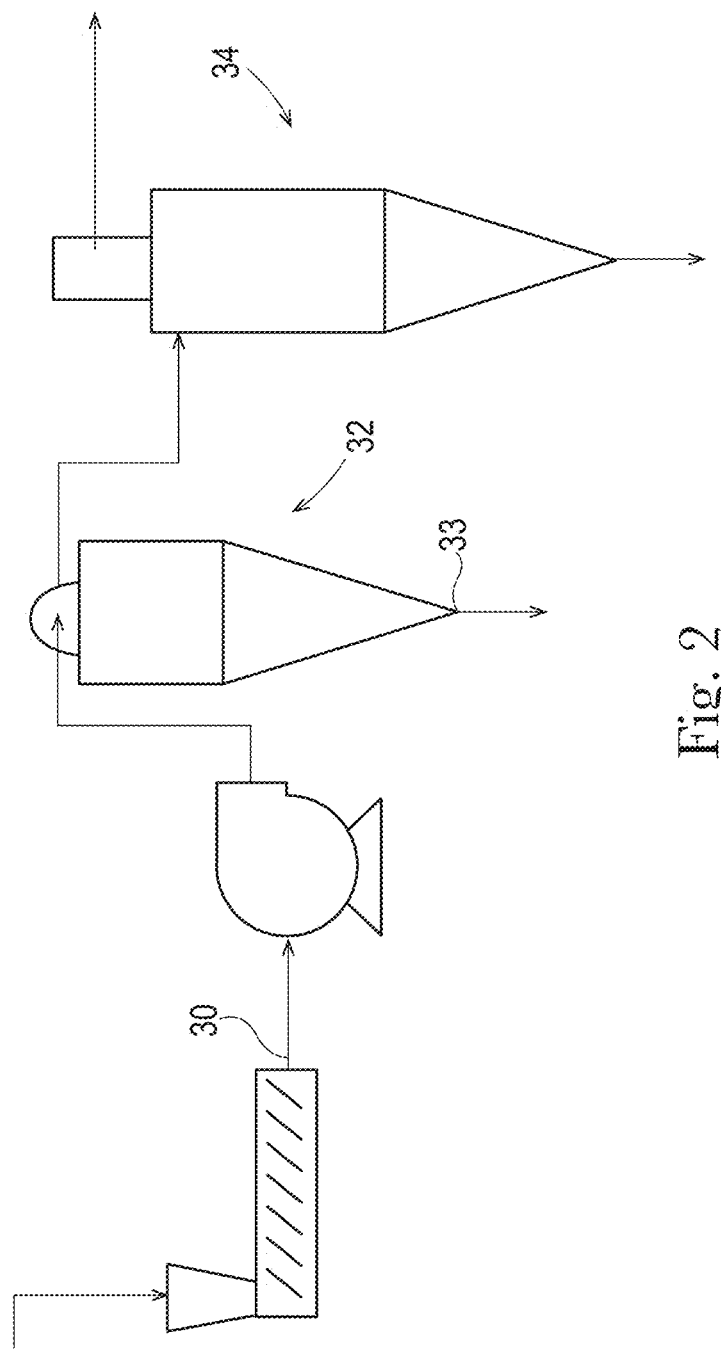
FIG. 2 is a schematic of a prior art process as described in U.S. Pat. No. 7,811,613.

Processes that include a step of disassociating separated trichome fibers from leaves and stems can produce trichome fiber yields higher than previously known processes, such as that exemplified in FIGS. 1 and 2. The trichome fiber yields from processes of the present invention can be greater than 15%, 20%, 25%, 30%, 33%, 35%, 37%, and more.

As noted above in relation to FIG. 3, outlet 122 of air classifier 120 allows for the collection of trichome fiber fines, which include fibers having a length of less than 100 microns. Trichome fiber fines can impart a great deal of softness to a fibrous structure, wherein even small incorporation levels (e.g., 1%, 2%, 3%, 5%, 7.5%) of the fines can be consumer noticeable in a final fibrous structure comprising product like a sanitary tissue product.

Fiber collections from a prior art process (FIGS. 1 and 2) and a process according to the present invention (FIGS. 1 and 3) were analyzed with an L&W STFI Fibermaster instrument. Among other things, the instrument reports length weighted proportion of fibers in various length ranges (e.g., 200-500 microns, 500-1500 microns, 1500-3000 microns), and a level of fines reported as a percentage on a length weighted basis of fibers having a length below 200 microns. Fiber collections from the prior art process contained 32% and 33% of fibers in the 200-500 micron range, while the improved process of the present invention resulted in fiber collections having 42% and 46% of its fibers in the 200-500 micron range. And fiber collections from the prior art process contained 10.70% and 11.80% fines, while the improved process of the present invention had about twice the amount of fines (19.05% and 22.75%). Thus, the improved processes enable collection of a higher percentage of small trichome fibers, which can impart various benefits to fibrous structures comprising the same including, for example, better softness and better flushability.

The inventors discovered that processes that include a step of disassociating separated trichome fibers from leaves and stems also produce a cleaner mass of collected fibers (including speck-free trichome fiber masses). As a result trichome fiber collections via outlet 122 and/or 124 can have L* color values of greater than or equal to about 70% and/or b* color values of less than or equal to about 15%. The color and intensity of the collected trichome fibers can be measured by reflectance spectrophotometer ASTM standard test methodology. Tristimulus L*, a*, b* color values are reported in term of the CIE 1976 color coordinate standard. Processes of the present invention, including that shown in FIG. 3 and similar process thereto, can eliminate the need for a washing step prior to incorporating the collected trichome fibers into a fibrous structure. One of ordinary skill in the art should appreciate however that an optional washing step can be used with the inventive processes to drive L* and/or b* values even higher. For example, an optional washing step can lead to trichome fiber masses having an L* color value of greater than or equal to about 80%, and/or a b* color value of less than or equal to about 10%. In others, the method of the present invention may further comprise the step of washing the end mass of material (trichome fiber masses) to increase its L* and/or b* values. Fibrous structures and sanitary tissue products comprising the same can have L* values as high as 92% and 95%.

Feedstock 100 can come from a variety of sources. Essentially all plants have trichomes. Those skilled in the art will recognize that some plants will have trichomes of sufficient mass fraction and/or the overall growth rate and/or robustness of the plant so that they may offer attractive agricultural economy to make them more suitable for a large commercial process, such as using them as a source of chemicals, e.g. cellulose, or assembling them into fibrous structures, such as disposable fibrous structures. Trichomes may have a wide range of morphology and chemical properties. For example, the trichomes may be in the form of fibers; namely, trichome fibers. Such trichome fibers may have a high length to diameter ratio.

The following sources are offered as non-limiting examples of trichome-bearing plants (suitable sources) for obtaining trichomes, especially trichome fibers.

Non-limiting examples of suitable sources for obtaining trichomes, especially trichome fibers, are plants in the Labiatae (Lamiaceae) family commonly referred to as the mint family.

Examples of suitable species in the Labiatae family include *Stachys byzantina*, also known as *Stachys lanata* commonly referred to as lamb's ear, woolly betony, or woundwort. The term *Stachys byzantina* as used herein also includes cultivars *Stachys byzantina* 'Primrose Heron', *Stachys byzantina* 'Helene von Stein' (sometimes referred to as *Stachys byzantina* 'Big Ears'), *Stachys byzantina* 'Cotton Boll', *Stachys byzantina* 'Variegated' (sometimes referred to as *Stachys byzantina* 'Striped Phantom'), and *Stachys byzantina* 'Silver Carpet'.

Additional examples of suitable species in the Labiatae family include the *arcticus* subspecies of *Thymus praecox*, commonly referred to as creeping thyme and the *pseudolanuginosus* subspecies of *Thymus praecox*, commonly referred to as wooly thyme.

Further examples of suitable species in the Labiatae family include several species in the genus *Salvia* (sage), including *Salvia leucantha*, commonly referred to as the Mexican bush sage; *Salvia tarahumara*, commonly referred to as the grape scented Indian sage; *Salvia apiana*, commonly referred to as white sage; *Salvia funereal*, commonly referred to as Death Valley sage; *Salvia sagittata*, commonly referred to as balsamic sage; and *Salvia argentiae*, commonly referred to as silver sage.

Even further examples of suitable species in the Labiatae family include *Lavandula lanata*, commonly referred to as wooly lavender; *Marrubium vulgare*, commonly referred to as horehound; *Plectranthus argentatus*, commonly referred to as silver shield; and *Plectranthus tomentosa*.

Non-limiting examples of other suitable sources for obtaining trichomes, especially trichome fibers are plants in the Asteraceae family commonly referred to as the sunflower family.

Examples of suitable species in the Asteraceae family include *Artemisia stelleriana*, also known as silver brocade; *Haplopappus macronema*, also known as the whitestem goldenbush; *Helichrysum petiolare*; *Centaurea maritime*, also known as *Centaurea gymnocarpa* or dusty miller; *Achillea tomentosum*, also known as wooly yarrow; *Anaphalis margaritacea*, also known as pearly everlasting; and *Encelia farinose*, also known as brittle bush.

Additional examples of suitable species in the Asteraceae family include *Senecio brachyglottis* and *Senecio haworthii*, the latter also known as *Kleinia haworthii*.

Non-limiting examples of other suitable sources for obtaining trichomes, especially trichome fibers, are plants in the Scrophulariaceae family commonly referred to as the figwort or snapdragon family.

An example of a suitable species in the Scrophulariaceae family includes *Pedicularis kanei*, also known as the wooly lousewort.

Additional examples of suitable species in the Scrophulariaceae family include the mullein species (*Verbascum*) such as *Verbascum hybridium*, also known as snow maiden; *Verbascum thapsus*, also known as common mullein; *Verbascum baldaccii*; *Verbascum bombyciferum*; *Verbascum broussa*; *Verbascum chaixii*; *Verbascum dumulsum*; *Verbascum laciniatum*; *Verbascum lanatum*; *Verbascum longifolium*; *Verbascum lychnitis*; *Verbascum olympicum*; *Verbascum paniculatum*; *Verbascum phlomoides*; *Verbascum phoeniceum*; *Verbascum speciosum*; *Verbascum thapsiforme*; *Verbascum virgatum*; *Verbascum wiedemannianum*; and various mullein hybrids including *Verbascum* 'Helen Johnson' and *Verbascum* 'Jackie'.

Further examples of suitable species in the Scrophulariaceae family include *Stemodia tomentosa* and *Stemodia durantifolia*.

Non-limiting examples of other suitable sources for obtaining trichomes, especially trichome fibers include *Greyia radlkoferi* and *Greyia flanmaganii* plants in the Greyiaceae family commonly referred to as the wild bottlebrush family.

Non-limiting examples of other suitable sources for obtaining trichomes, especially trichome fibers include members of the Fabaceae (legume) family. These include the *Glycine max*, commonly referred to as the soybean, and *Trifolium pratense L*, commonly referred to as medium and/or mammoth red clover.

Non-limiting examples of other suitable sources for obtaining trichomes, especially trichome fibers include members of the Solanaceae family including varieties of *Lycopersicum esculentum*, otherwise known as the common tomato.

Non-limiting examples of other suitable sources for obtaining trichomes, especially trichome fibers include members of the Convolvulaceae (morning glory) family, including *Argyreia nervosa*, commonly referred to as the wooly morning glory and *Convolvulus cneorum*, commonly referred to as the bush morning glory.

Non-limiting examples of other suitable sources for obtaining trichomes, especially trichome fibers include members of the Malvaceae (mallow) family, including *Anoda cristata*, commonly referred to as spurred anoda and *Abutilon theophrasti*, commonly referred to as velvetleaf.

Non-limiting examples of other suitable sources for obtaining trichomes, especially trichome fibers include *Buddleia marrubiifolia*, commonly referred to as the wooly butterfly bush of the Loganiaceae family; the *Casimiroa tetrameria*, commonly referred to as the wooly leafed sapote of the Rutaceae family; the *Ceanothus tomentosus*, commonly referred to as the wooly leafed mountain liliac of the Rhamnaceae family; the 'Philippe Vapelle' cultivar of *renardii* in the Geraniaceae (geranium) family; the *Tibouchina urvilleana*, commonly referred to as the Brazilian spider flower of the Melastomataceae family; the *Tillandsia recurvata*, commonly referred to as ballmoss of the Bromeliaceae (pineapple) family; the *Hypericum tomentosum*, commonly referred to as the wooly St. John's wort of the Hypericaceae family; the *Chorizanthe orcuttiana*, commonly referred to as the San Diego spineflower of the Polygonaceae family; *Eremocarpus setigerus*, commonly referred to as the doveweed of the Euphorbiaceae or spurge family; *Kalanchoe tomentosa*, commonly referred to as the panda plant of the Crassulaceae family; and *Cynodon dactylon*, commonly referred to as Bermuda grass, of the Poaceae family; and *Congea tomentosa*, commonly referred to as the shower orchid, of the Verbenaceae family.

Suitable trichome-bearing plants are commercially available from nurseries and other plant-selling commercial venues. For example, *Stachys byzantina* may be purchased and/or viewed at Blanchette Gardens, Carlisle, Mass. In one example, a trichome fiber suitable for use in the fibrous structures of the present invention comprises cellulose. In another example, a trichome fiber suitable for use in the fibrous structures of the present invention comprises a fatty acid. In another example, a trichome fiber suitable for use in the fibrous structures of the present invention is hydrophobic. In yet another example, a trichome fiber suitable for use in the fibrous structures of the present invention is less hydrophilic that softwood fibers. This characteristic of the trichome fiber may facilitate a reduction in drying temperatures needed to dry fibrous structures comprising such trichome fiber and/or may facilitate making the fibrous structures containing such trichome fiber at a faster rate.

Figure 4:
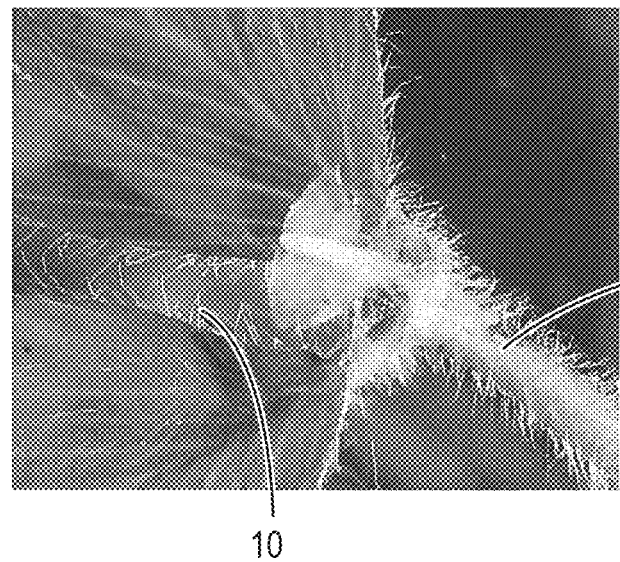
FIG. 4 is a light micrograph of a leaf and leaf stem illustrating trichome fibers present on red clover, *Trifolium pratense L.*
Figure 5:
FIG. 5 is a light micrograph of a lower stem illustrating trichome fibers present on red clover, *Trifolium pratense L.*

As shown in FIG. 4, numerous trichomes 10 are present on this red clover leaf and leaf stem. FIG. 5 shows numerous trichomes 10 present on a red clover lower stem.

Figure 6:
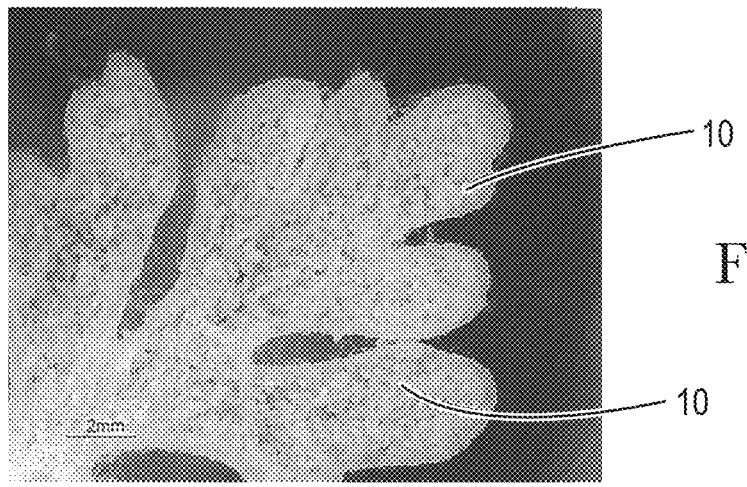
FIG. 6 is a light micrograph of a leaf illustrating trichome fibers present on dusty miller, *Centaurea gymnocarpa.*
Figure 7:
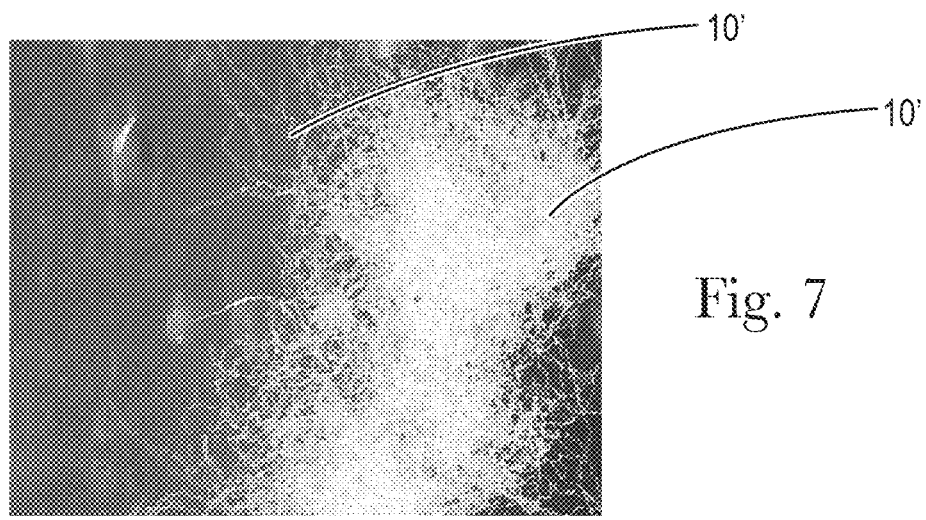
FIG. 7 is a light micrograph of individualized trichome fibers individualized from a leaf of dusty miller, *Centaurea gymnocarpa.*

As shown in FIG. 6, a dusty miller leaf is contains numerous trichomes 10. FIG. 7 shows individualized trichomes 10' obtained from a dusty miller leaf.

Figure 8:
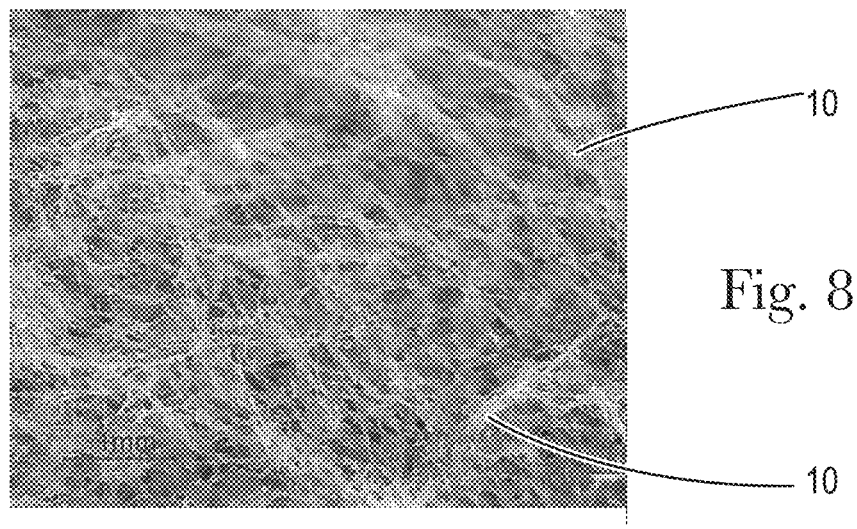
FIG. 8 is a light micrograph of a basal leaf illustrating trichome fibers present on silver sage, *Salvia argentiae.*
Figure 9:
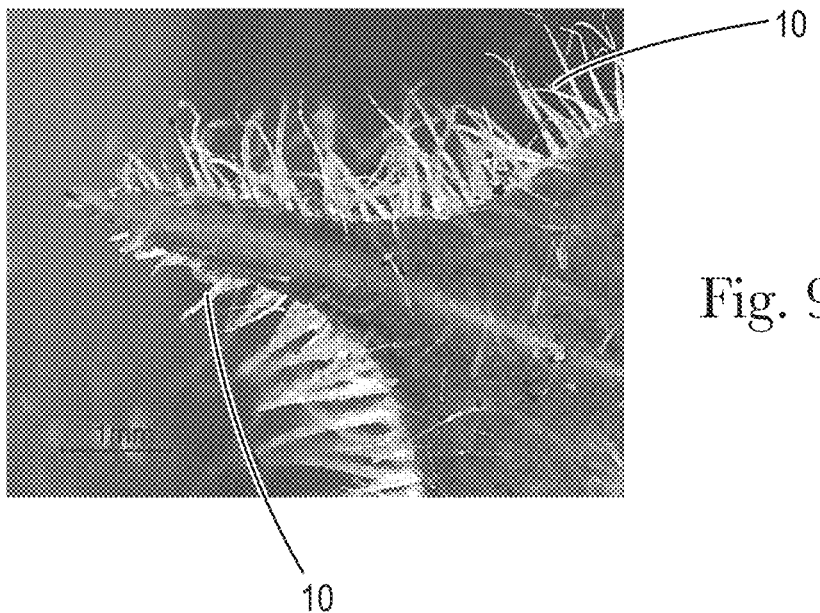
FIG. 9 is a light micrograph of a bloom-stalk leaf illustrating trichome fibers present in silver sage, *Salvia argentiae.*

As shown in FIG. 8, a basal leaf on a silver sage contains numerous trichomes 10. FIG. 9 shows trichomes 10 present on a bloom-stalk leaf of a silver sage.

Figure 10:
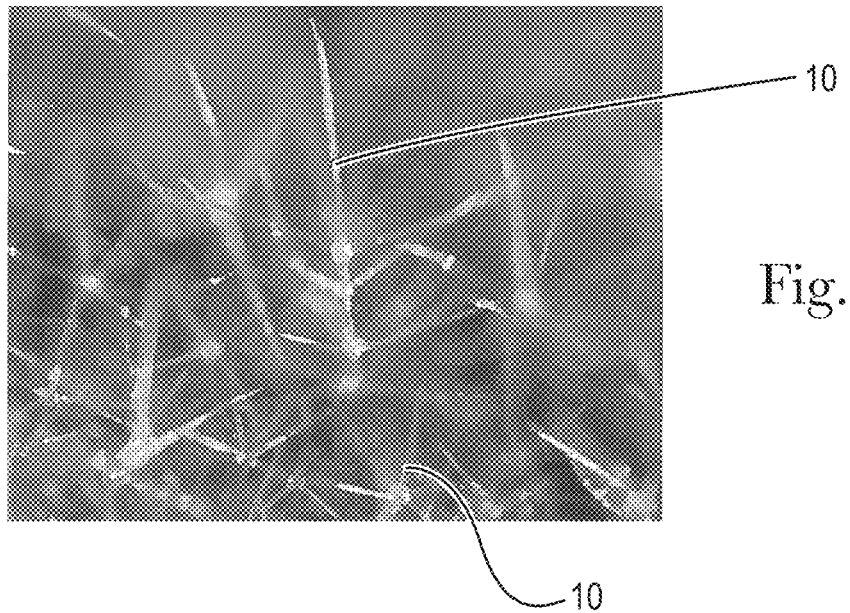
FIG. 10 is a light micrograph of a mature leaf illustrating trichome fibers present on common mullein, *Verbascum Thapsus.*
Figure 11:
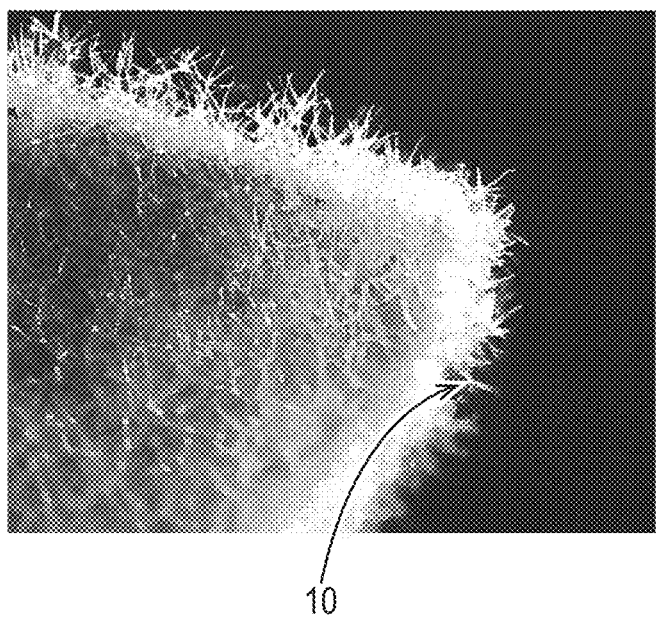
FIG. 11 is a light micrograph of a juvenile leaf illustrating trichome fibers present on common mullein, *Verbascum Thapsus.*

As shown in FIG. 10, trichomes 10 are present on a mature leaf of common mullein. FIG. 11 shows trichomes 10 present on a juvenile leaf of common mullein.

Figure 12:
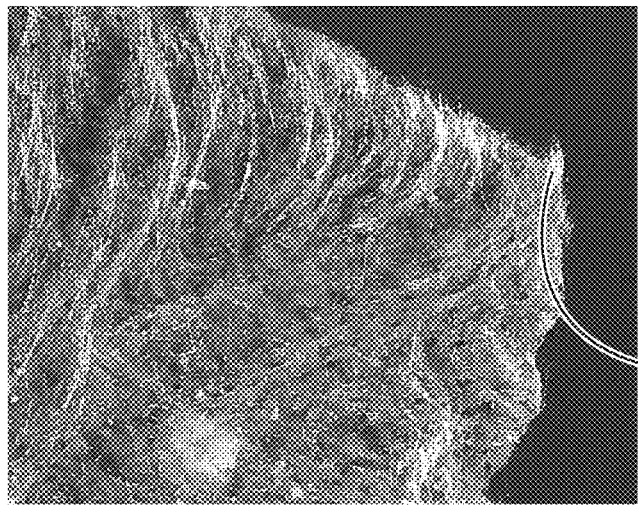
FIG. 12 is a light micrograph of a perpendicular view of a leaf illustrating trichome fibers present on wooly betony, *Stachys byzantine.*
Figure 13:
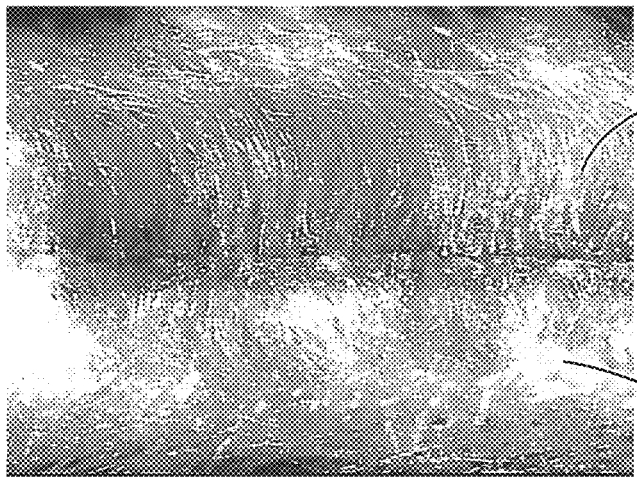
FIG. 13 is a light micrograph of a cross-sectional view of a leaf illustrating trichome fibers present on wooly betony, *Stachys byzantine.*
Figure 14:
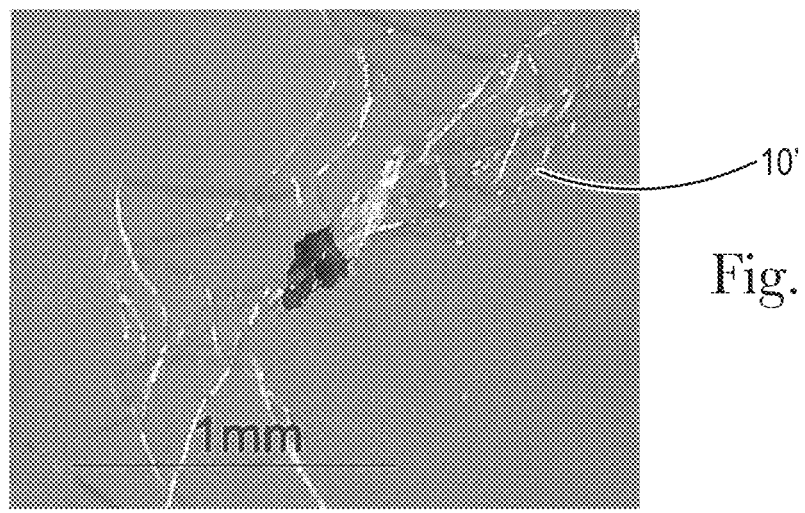
FIG. 14 is a light micrograph of individualized trichome fibers in the form of a plurality of trichome fibers bound by their individual attachment to a common remnant of a host plant, wooly betony, *Stachys byzantina.*

FIG. 12 shows, via a perpendicular view, trichomes 10 present on a leaf of wooly betony. FIG. 13 is a cross-sectional view of a leaf of wooly betony containing trichomes 10. FIG. 14 shows individualized trichomes 10' obtained from a wooly betony leaf.

Trichome fibers can be liberated through processes of the present invention for incorporation into fibrous structures. "Fibrous structure" as used herein means a structure that comprises one or more fibers. Non-limiting examples of processes for making fibrous structures include known wet-laid papermaking processes and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous suspension is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structures will generally comprise a fiber blend. The fiber blend may comprise trichome fibers, for example trichome fibers that exhibit a length of less than 100 microns, softwood fibers, and/or hardwood fibers. In one example, the fiber blend comprises at least 1% and/or at least 3% and/or at least 5% and/or at least 7.5% of trichome fibers. In one example, the fiber blend comprises at least 1% of trichome fibers, and the wood fibers comprise both hardwood fibers and softwood fibers. Fibrous structures according to this invention may contain from about 0.1% to about 100% and/or from about 0.5% to about 90% and/or from about 0.5% to about 80% and/or from about 0.5% to about 50% and/or from about 1% to about 40% and/or from about 2% to about 30% and/or from about 5% to about 25% by weight on a dry fiber basis of trichome fibers.

The fiber blend may also include other fibers besides trichome fibers. Natural fibrous structure-making fibers useful in the present invention include animal fibers, mineral fibers, other plant fibers (in addition to the trichomes of the present invention) and mixtures thereof. Animal fibers may, for example, be selected from the group consisting of: wool, silk and mixtures thereof. The other plant fibers may, for example, be derived from a plant selected from the group consisting of: wood, cotton, cotton linters, flax, sisal, abaca, hemp, hesperaloe, jute, bamboo, bagasse, kudzu, corn, sorghum, gourd, agave, loofah and mixtures thereof.

Wood fibers; often referred to as wood pulps include chemical pulps, such as kraft (sulfate) and sulfite pulps, as well as mechanical and semi-chemical pulps including, for example, groundwood, thermomechanical pulp, chemi-mechanical pulp (CMP), chemi-thermomechanical pulp (CTMP), neutral semi-chemical sulfite pulp (NSCS). Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified and/or layered web. U.S. Pat. Nos. 4,300,981 and 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

The wood pulp fibers may be short (typical of hardwood fibers) or long (typical of softwood fibers). Non-limiting examples of short fibers include fibers derived from a fiber source selected from the group consisting of Acacia, Eucalyptus, Maple, Oak, Aspen, Birch, Cottonwood, Alder, Ash, Cherry, Elm, Hickory, Poplar, Gum, Walnut, Locust, Sycamore, Beech, Catalpa, Sassafras, Gmelina, Albizia, Anthocephalus, and Magnolia. Non-limiting examples of long fibers include fibers derived from Pine, Spruce, Fir, Tamarack, Hemlock, Cypress, and Cedar. Softwood fibers derived from the kraft process and originating from more-northern climates may be preferred. These are often referred to as northern softwood kraft (NSK) pulps.

Synthetic fibers may be selected from the group consisting of: wet spun fibers, dry spun fibers, melt spun (including melt blown) fibers, synthetic pulp fibers and mixtures thereof. Synthetic fibers may, for example, be comprised of cellulose (often referred to as "rayon"); cellulose derivatives such as esters, ether, or nitrous derivatives; polyolefins (including polyethylene and polypropylene); polyesters (including polyethylene terephthalate); polyamides (often referred to as "nylon"); acrylics; non-cellulosic polymeric carbohydrates (such as starch, chitin and chitin derivatives such as chitosan); polylactic acids, polyhydroxyalkanoates, polycaprolactones, and mixtures thereof. In one example, synthetic fibers may be used as binding agent.

The fibrous structure may comprise fibers, films and/or foams that comprise a hydroxyl polymer and optionally a crosslinking system. Non-limiting examples of suitable hydroxyl polymers include polyols, such as polyvinyl alcohol, polyvinyl alcohol derivatives, polyvinyl alcohol copolymers, starch, starch derivatives, chitosan, chitosan derivatives, cellulose derivatives such as cellulose ether and ester derivatives, gums, arabinans, galactans, proteins and various other polysaccharides and mixtures thereof. For example, a web of the fibrous structure may comprise a continuous or substantially continuous fiber comprising a starch hydroxyl polymer and a polyvinyl alcohol hydroxyl polymer produced by dry spinning and/or solvent spinning (both unlike wet spinning into a coagulating bath) a composition comprising the starch hydroxyl polymer and the polyvinyl alcohol hydroxyl polymer.

The fibrous structure may comprise other additives, such as wet strength additives, softening additives, solid additives (such as starch, clays), dry strength resins, wetting agents, lint resisting and/or reducing agents, absorbency-enhancing agents, immobilizing agents, especially in combination with emollient lotion compositions, antiviral agents including organic acids, antibacterial agents, polyol polyesters, antimigration agents, polyhydroxy plasticizers and mixtures thereof. Such other additives may be added to the fiber furnish, the embryonic fibrous web and/or the fibrous structure. Such other additives may be present in the fibrous structure at any level based on the dry weight of the fibrous structure. The other additives may be present in the fibrous structure at a level of from about 0.001 to about 50% and/or from about 0.001 to about 20% and/or from about 0.01 to about 5% and/or from about 0.03 to about 3% and/or from about 0.1 to about 1.0% by weight, on a dry fibrous structure basis.

Non-limiting types of fibrous structures include conventionally felt-pressed fibrous structures; pattern densified fibrous structures; and high-bulk, uncompacted fibrous structures. The fibrous structures may be of a homogenous or multilayered (two or three or more layers) construction; and the sanitary tissue products made therefrom may be of a single-ply or multi-ply construction.

In one example, the fibrous structure is a pattern densified fibrous structure characterized by having a relatively high-bulk region of relatively low fiber density and an array of densified regions of relatively high fiber density. The high-bulk field is characterized as a field of pillow regions. The densified zones are referred to as knuckle regions. The knuckle regions exhibit greater density than the pillow regions. The densified zones may be discretely spaced within the high-bulk field or may be interconnected, either fully or partially, within the high-bulk field. Typically, from about 8% to about 65% of the fibrous structure surface comprises densified knuckles, the knuckles may exhibit a relative density of at least 125% of the density of the high-bulk field. Processes for making pattern densified fibrous structures are well known in the art as exemplified in U.S. Pat. Nos. 3,301,746, 3,974,025, 4,191,609 and 4,637, 859.

The fibrous structures comprising a trichome fiber in accordance with the present invention may be in the form of through-air-dried fibrous structures, differential density fibrous structures, differential basis weight fibrous structures, wet laid fibrous structures, air laid fibrous structures (examples of which are described in U.S. Pat. Nos. 3,949, 035 and 3,825,381), conventional dried fibrous structures, creped or uncreped fibrous structures, patterned-densified or non-patterned-densified fibrous structures, compacted or uncompacted fibrous structures, nonwoven fibrous structures comprising synthetic or multicomponent fibers, homogeneous or multilayered fibrous structures, double re-creped fibrous structures, foreshortened fibrous structures, co-form fibrous structures (examples of which are described in U.S. Pat. No. 4,100,324) and mixtures thereof.

In one example, the air laid fibrous structure is selected from the group consisting of thermal bonded air laid (TBAL) fibrous structures, latex bonded air laid (LBAL) fibrous structures and mixed bonded air laid (MBAL) fibrous structures.

The fibrous structures may exhibit a substantially uniform density or may exhibit differential density regions, in other words regions of high density compared to other regions within the patterned fibrous structure. Typically, when a fibrous structure is not pressed against a cylindrical dryer, such as a Yankee dryer, while the fibrous structure is still wet and supported by a through-air-drying fabric or by another fabric or when an air laid fibrous structure is not spot bonded, the fibrous structure typically exhibits a substantially uniform density.

The fibrous structures of the present invention may be subjected to any suitable post processing including, but not limited to, printing, embossing, calendaring, slitting, folding, combining with other fibrous structures, and the like.

The fibrous structures of the present invention are particularly useful for making sanitary tissue products. "Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll. The sanitary tissue products may exhibit a basis weight between about 10 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$. In addition, the sanitary tissue product may exhibit a basis weight between about 40 g/m$^2$ to about 120 g/m$^2$ and/or from about 50 g/m$^2$ to about 110 g/m$^2$ and/or from about 55 g/m$^2$ to about 105 g/m$^2$ and/or from about 60 to 100 g/m$^2$ as measured according to the Basis Weight Test Method described herein.

The sanitary tissue products may exhibit a total dry tensile of at least 150 g/in and/or from about 200 g/in to about 1000 g/in and/or from about 250 g/in to about 850 g/in as measured according to the Total Dry Tensile Test Method described herein.

In another example, the sanitary tissue product may exhibit a total dry tensile of at least 300 g/in and/or at least 350 g/in and/or at least 400 g/in and/or at least 450 g/in and/or at least 500 g/in and/or from about 500 g/in to about 1000 g/in and/or from about 550 g/in to about 850 g/in and/or from about 600 g/in to about 800 g/in as measured according to the Total Dry Tensile Test Method described herein. In one example, the sanitary tissue product exhibits a total dry tensile strength of less than 1000 g/in and/or less than 850 g/in as measured according to the Total Dry Tensile Test Method described herein.

In another example, the sanitary tissue product may exhibit a total dry tensile of at least 500 g/in and/or at least 600 g/in and/or at least 700 g/in and/or at least 800 g/in and/or at least 900 g/in and/or at least 1000 g/in and/or from about 800 g/in to about 5000 g/in and/or from about 900 g/in to about 3000 g/in and/or from about 900 g/in to about 2500 g/in and/or from about 1000 g/in to about 2000 g/in as measured according to the Total Dry Tensile Test Method described herein.

"Basis Weight" as used herein is the weight per unit area of a sample reported in lbs./3000 ft$^2$ or g/m$^2$. Basis weight is measured by preparing one or more samples of a certain area (m$^2$) and weighing the sample(s) of a fibrous structure according to the present invention and/or a sanitary tissue product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples (m$^2$) is measured. The basis weight (g/m$^2$) is calculated by dividing the average weight (g) by the average area of the samples (m$^2$).

"Softness" of a fibrous structure according to the present invention and/or a paper product comprising such fibrous structure is determined as follows. Ideally, prior to softness testing, the samples to be tested should be conditioned according to Tappi Method #T4020M-88. Here, samples are preconditioned for 24 hours at a relative humidity level of 10 to 35% and within a temperature range of 22° C. to 40° C. After this preconditioning step, samples should be conditioned for 24 hours at a relative humidity of 48% to 52% and within a temperature range of 22° C. to 24° C. Ideally, the softness panel testing should take place within the confines of a constant temperature and humidity room. If this is not feasible, all samples, including the controls, should experience identical environmental exposure conditions.

Softness testing is performed as a paired comparison in a form similar to that described in "Manual on Sensory Testing Methods", ASTM Special Technical Publication 434, published by the American Society For Testing and Materials 1968 and is incorporated herein by reference. Softness is evaluated by subjective testing using what is referred to as a Paired Difference Test. The method employs a standard external to the test material itself. For tactile perceived softness two samples are presented such that the subject cannot see the samples, and the subject is required to choose one of them on the basis of tactile softness. The result of the test is reported in what is referred to as Panel Score Unit (PSU). With respect to softness testing to obtain the softness data reported herein in PSU, a number of softness panel tests are performed. In each test ten practiced softness judges are asked to rate the relative softness of three sets of paired samples. The pairs of samples are judged one pair at a time by each judge: one sample of each pair being designated X and the other Y. Briefly, each X sample is graded against its paired Y sample as follows:

1. a grade of plus one is given if X is judged to may be a little softer than Y, and a grade of minus one is given if Y is judged to may be a little softer than X;

2. a grade of plus two is given if X is judged to surely be a little softer than Y, and a grade of minus two is given if Y is judged to surely be a little softer than X;

3. a grade of plus three is given to X if it is judged to be a lot softer than Y, and a grade of minus three is given if Y is judged to be a lot softer than X; and, lastly:

4. a grade of plus four is given to X if it is judged to be a whole lot softer than Y, and a grade of minus 4 is given if Y is judged to be a whole lot softer than X.

The grades are averaged and the resultant value is in units of PSU. The resulting data are considered the results of one panel test. If more than one sample pair is evaluated then all sample pairs are rank ordered according to their grades by paired statistical analysis. Then, the rank is shifted up or down in value as required to give a zero PSU value to which ever sample is chosen to be the zero-base standard. The other samples then have plus or minus values as determined by their relative grades with respect to the zero base standard. The number of panel tests performed and averaged is such that about 0.2 PSU represents a significant difference in subjectively perceived softness.

Any suitable process for making fibrous structures known in the art may be used to make trichome-containing fibrous structures of the present invention. In one example, the trichome-containing fibrous structures of the present invention are made by a wet laid fibrous structure making process. In another example, the trichome-containing fibrous structures of the present invention are made by an air laid fibrous structure making process. In one example, a trichome-containing fibrous structure is made by the process comprising the steps of: a) preparing a fiber furnish (slurry) by mixing a trichome with water; b) depositing the fiber furnish on a foraminous forming surface to form an embryonic fibrous web; and c) drying the embryonic fibrous web. In one example, a fiber furnish comprising a trichome, such as a trichome fiber, is deposited onto a foraminuous forming surface via a headbox.

The following Example illustrates a non-limiting example for the preparation of sanitary tissue product comprising a fibrous structure according to the present invention on a pilot-scale Fourdrinier fibrous structure making machine. Individualized trichomes can be first prepared from *Stachys byzantina* bloom stalks consisting of the dried stems, leaves, and pre-flowering buds, by processing dried *Stachys byzantina* plant matter through steps as shown in FIGS. 1 and 3 above.

Special care must be taken while processing the trichomes. Sixty pounds of trichome fiber is pulped in a 50 gallon pulper by adding water in half amount required to make a 1% trichome fiber slurry. This is done to prevent trichome fibers over flowing and floating on surface of the water due to lower density and hydrophobic nature of the trichome fiber. After mixing and stirring a few minutes, the pulper is stopped and the remaining trichome fibers are pushed in while water is added. After pH adjustment, it is pulped for 30 minutes, then dumped in a separate chest for delivery onto the machine headbox. This allows one to place trichome fibers in one or more layers, alone or mixed with other fibers, such as hardwood fibers and/or softwood fibers. During this particular run, the trichome fibers are added exclusively on the wire outer layer as the product is converted wire side up; therefore it is desirable to add the trichome fibers to the wire side (the side where the tactile feel senses paper the most).

The aqueous slurry of eucalyptus fibers is prepared at about 3% by weight using a conventional repulper. This slurry is also passed through a stock pipe toward the stock pipe containing the trichome fiber slurry.

The 1% trichome fiber slurry is combined with the 3% eucalyptus fiber slurry in a proportion which yields about 13.3% trichome fibers and 86.7% eucalyptus fibers. The stockpipe containing the combined trichome and eucalyptus fiber slurries is directed toward the wire layer of headbox of a Fourdrinier machine.

In order to impart temporary wet strength to the finished fibrous structure, a 1% dispersion of temporary wet strengthening additive (e.g., Fennorez 91® commercially available from Kemira) is prepared and is added to the NSK fiber stock pipe at a rate sufficient to deliver 0.3% temporary wet strengthening additive based on the dry weight of the NSK fibers. The absorption of the temporary wet strengthening additive is enhanced by passing the treated slurry through an in-line mixer.

The trichome fiber and eucalyptus fiber slurry is diluted with white water at the inlet of a fan pump to a consistency of about 0.15% based on the total weight of the eucalyptus and trichome fiber slurry. The NSK fibers, likewise, are diluted with white water at the inlet of a fan pump to a consistency of about 0.15% based on the total weight of the NSK fiber slurry. The eucalyptus/trichome fiber slurry and the NSK fiber slurry are both directed to a layered headbox capable of maintaining the slurries as separate streams until they are deposited onto a forming fabric on the Fourdrinier.

"DC 2310" antifoam is dripped into the wirepit to control foam to maintain whitewater levels of 10 ppm of antifoam.

The fibrous structure making machine has a layered headbox having a top chamber, a center chamber, and a bottom chamber. The eucalyptus/trichome combined fiber slurry is pumped through the top headbox chamber, eucalyptus fiber slurry is pumped through the bottom headbox chamber, and, simultaneously, the NSK fiber slurry is pumped through the center headbox chamber and delivered in superposed relation onto the Fourdrinier wire to form thereon a three-layer embryonic web, of which about 83% is made up of the eucalyptus/trichome fibers and 17% is made up of the NSK fibers. Dewatering occurs through the Fourdrinier wire and is assisted by a deflector and vacuum boxes. The Fourdrinier wire is of a 5-shed, satin weave configuration having 87 machine-direction and 76 cross-machine-direction monofilaments per inch, respectively. The speed of the Fourdrinier wire is about 750 fpm (feet per minute).

The embryonic wet web is transferred from the Fourdrinier wire, at a fiber consistency of about 15% at the point of transfer, to a patterned drying fabric. The speed of the patterned drying fabric is the same as the speed of the Fourdrinier wire. The drying fabric is designed to yield a pattern densified tissue with discontinuous low-density deflected areas arranged within a continuous network of high density (knuckle) areas. This drying fabric is formed by casting an impervious resin surface onto a fiber mesh supporting fabric. The supporting fabric is a 45×52 filament, dual layer mesh. The thickness of the resin cast is about 12 mils above the supporting fabric. A suitable process for making the patterned drying fabric is described in published application US 2004/0084167 A1.

Further de-watering is accomplished by vacuum assisted drainage until the web has a fiber consistency of about 30%.

While remaining in contact with the patterned drying fabric, the web is pre-dried by air blow-through pre-dryers to a fiber consistency of about 65% by weight.

After the pre-dryers, the semi-dry web is transferred to the Yankee dryer and adhered to the surface of the Yankee dryer with a sprayed creping adhesive. The creping adhesive is an aqueous dispersion with the actives consisting of about 22% polyvinyl alcohol, about 11% CREPETROL A3025, and about 67% CREPETROL R6390. CREPETROL A3025 and CREPETROL R6390 are commercially available from Hercules Incorporated of Wilmington, Del. The creping adhesive is delivered to the Yankee surface at a rate of about 0.15% adhesive solids based on the dry weight of the web. The fiber consistency is increased to about 97% before the web is dry creped from the Yankee with a doctor blade.

The doctor blade has a bevel angle of about 25 degrees and is positioned with respect to the Yankee dryer to provide an impact angle of about 81 degrees. The Yankee dryer is operated at a temperature of about 350° F. (177° C.) and a speed of about 800 fpm. The fibrous structure is wound in a roll using a surface driven reel drum having a surface speed of about 656 feet per minute. The fibrous structure may be subsequently converted into a two-ply sanitary tissue product having a basis weight of about 50 g/m².

Test Methods

Unless otherwise specified, all tests described herein including those described under the Definitions section and the following test methods are conducted on samples that have been conditioned in a conditioned room at a temperature of 73° F.±4° F. (about 23° C.±2.2° C.) and a relative humidity of 50%±10% for 2 hours prior to the test. All tests are conducted in such conditioned room. Do not test samples that have defects such as wrinkles, tears, holes, and like.

Total Dry Tensile Strength Test Method

Cut at least eight 1 inch wide strips of the fibrous structure and/or sanitary tissue product to be tested in the machine direction. Cut at least eight 1 inch wide strips in the cross direction. If the machine direction and cross direction are not readily ascertainable, then the cross direction will be the strips that result in the lower peak load tensile. For the wet measurements, each sample is wetted by submerging the sample in a distilled water bath for 30 seconds. The wet property of the wet sample is measured within 30 seconds of removing the sample from the bath.

For the actual measurements of the properties, use a Thwing-Albert Intelect II Standard Tensile Tester (Thwing-Albert Instrument Co. of Philadelphia, Pa.). Insert the flat face clamps into the unit and calibrate the tester according to the instructions given in the operation manual of the Thwing-Albert Intelect II. Set the instrument crosshead speed to 4.00 in/min and the 1st and 2nd gauge lengths to 4.00 inches. The break sensitivity is set to 20.0 grams and the sample width is set to 1.00 inch. The energy units are set to TEA and the tangent modulus (Modulus) trap setting is set to 38.1 g.

After inserting the fibrous structure sample strip into the two clamps, the instrument tension can be monitored. If it shows a value of 5 grams or more, the fibrous structure sample strip is too taut. Conversely, if a period of 2-3 seconds passes after starting the test before any value is recorded, the fibrous structure sample strip is too slack.

Start the tensile tester as described in the tensile tester instrument manual. When the test is complete, read and record the following with units of measure:

Peak Load Tensile (Tensile Strength) (g/in)
Peak Elongation (Elongation) (%)
Peak CD TEA (Wet CD TEA) (in-g/in²)
Tangent Modulus (Dry MD Modulus and Dry CD Modulus) (at 15 g/cm)

Test each of the samples in the same manner, recording the above measured values from each test. Average the values for each property obtained from the samples tested to obtain the reported value for that property.

Total Dry Tensile (TDT)=Peak Load MD Tensile (g/in)+Peak Load CD Tensile (g/in)

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous structure comprising a fiber blend that comprises wood fibers and trichome fibers, wherein from about 42% to about 46% of the trichome fibers have a length that is from 200-500 microns.

2. The fibrous structure of claim 1, wherein the fiber blend comprises at least 1% of trichome fibers.

3. The fibrous structure of claim 1, wherein the fiber blend comprises from about 1% to about 40% of trichome fibers.

4. The fibrous structure of claim 1, wherein the fiber blend comprises from about 2% to about 30% of trichome fibers.

5. The fibrous structure of claim 1, wherein the fiber blend comprises from about 5% to about 25% of trichome fibers.

6. The fibrous structure of claim 1, wherein the fiber blend comprises at least 1% of trichome fibers, and the wood fibers comprise both hardwood fibers and softwood fibers.

7. A single or multi ply sanitary tissue product comprising the fibrous structure according to claim 1.

8. The sanitary tissue product of claim 7, wherein the fibrous structure comprises an additive selected from the group consisting of: wet strength additives, softening agents, and mixtures thereof.

9. The sanitary tissue product of claim 7, wherein the sanitary tissue product exhibits a total dry tensile of from about 200 g/in to about 1000 g/in, as measured according to the Total Dry Tensile Test Method described herein.

10. The sanitary tissue product of claim 7, wherein the sanitary tissue product is toilet tissue.

11. The fibrous structure of claim 1, wherein the trichome fibers are derived from a plant in the *Stachys* genus.

12. The fibrous structure of claim 1, wherein the trichome fibers comprise an L* color value of greater than about 70%.

13. The fibrous structure of claim 1, wherein the trichome fibers comprise a b* color value of less than about 15%.

14. The fibrous structure of claim 3, wherein the fiber blend comprises at least 1% of trichome fibers, and the wood fibers comprise both hardwood fibers and softwood fibers.

15. A single or multi ply sanitary tissue product comprising the fibrous structure according to claim 3.

16. The sanitary tissue product of claim 15, wherein the sanitary tissue product exhibits a total dry tensile of from about 200 g/in to about 1000 g/in, as measured according to the Total Dry Tensile Test Method described herein.

17. The sanitary tissue product of claim 16, wherein the fibrous structure comprises an additive selected from the group consisting of: wet strength additives, softening agents, and mixtures thereof.

18. The sanitary tissue product of claim 17, wherein the sanitary tissue product is multi ply.

19. The sanitary tissue product of claim 18, wherein each ply of the multi ply sanitary tissue product comprises trichome fibers.

20. A multi ply sanitary tissue product comprising the fibrous structure according to claim 1, wherein each ply comprises trichome fibers.

* * * * *